United States Patent [19]

Gessner

[11] Patent Number: 5,270,107
[45] Date of Patent: Dec. 14, 1993

[54] HIGH LOFT NONWOVEN FABRICS AND METHOD FOR PRODUCING SAME

[75] Inventor: Scott L. Gessner, Encinitas, Calif.

[73] Assignee: Fiberweb North America, Simpsonville, S.C.

[21] Appl. No.: 870,609

[22] Filed: Apr. 16, 1992

[51] Int. Cl.$^5$ .......................... D02G 3/00; D04H 1/04
[52] U.S. Cl. .................... 428/296; 428/286; 428/369; 428/298
[58] Field of Search .................. 428/369, 296

[56] References Cited

U.S. PATENT DOCUMENTS

| | | | |
|---|---|---|---|
| 2,991,508 | 7/1961 | Fields et al. | 264/211.21 |
| 3,415,796 | 12/1968 | Souder et al. | 428/141 |
| 3,574,808 | 4/1971 | Matthews et al. | 264/98 |
| 3,836,413 | 9/1974 | Ropiequet | 428/294 |
| 3,920,782 | 11/1975 | Cogswell | 264/98 |
| 4,015,924 | 4/1977 | LaNieve | 425/455 F |
| 4,425,292 | 1/1984 | Kanotz | 264/174 |
| 4,485,062 | 11/1984 | Dawes et al. | 264/171 |
| 4,518,744 | 5/1985 | Brody | 525/184 |
| 4,521,364 | 6/1985 | Norota et al. | 264/176 F |
| 4,568,506 | 2/1986 | Kiriyama et al. | 264/171 |
| 4,615,858 | 10/1986 | Su | 264/564 |
| 4,623,502 | 11/1986 | Cohen | 264/176.1 |
| 4,734,240 | 3/1988 | Chung et al. | 264/211.13 |
| 4,790,736 | 12/1988 | Keuchel | 425/66 |

*Primary Examiner*—George F. Lesmes
*Assistant Examiner*—Chris Raimund
*Attorney, Agent, or Firm*—Bell, Seltzer, Park & Gibson

[57] ABSTRACT

A nonwoven filamentary web having high loft is produced by extruding a molten thermoplastic polymer or polymer blend through a spinneret to form continuous filaments while maintaining extrusion conditions which induce melt-fracture of the extrudate; attenuating the thus extruded melt-fractured filaments to obtain filamentary material having a crimped structure; and depositing the melt-fractured filamentary material on a collection surface and forming a web therefrom.

9 Claims, 2 Drawing Sheets

HIGH LOFT NONWOVEN FABRICS AND METHOD FOR PRODUCING SAME

FIELD OF THE INVENTION

The present invention relates to the production of nonwoven fabrics having improved properties, and more particularly to the production of a high loft nonwoven fabric comprised of crimped filamentary material.

BACKGROUND OF THE INVENTION

Nonwoven fabrics are used in a wide variety of everyday applications, as for example, as components in absorbent products such as disposable diapers, adult incontinence pads and sanitary napkins, in medical applications such as surgical gowns, surgical drapes, sterilization wraps, and in numerous other applications such as disposable wipes, carpets and filtration media.

Nonwoven fabrics can be produced by a number of different methods. One such method is spinbonding, a significant and growing area that is becoming more prominent in the production of nonwovens. Various spinbonding techniques exist, but all include the basic steps of extruding continuous filaments, quenching the filaments, drawing or attenuating the filaments by a high velocity fluid, and collecting the filaments on a surface to form a web.

Spunbonded nonwoven webs exhibit several desirable characteristics. However, spunbonded nonwoven webs generally do not have a very high loft or volume and thus exhibit relatively low thickness for any given fabric weight. It would be advantageous, given the increasing use of nonwoven webs, especially as coverstock in disposable products, to produce a nonwoven web with increased loft. Coverstock produced from nonwoven webs with increased loft would exhibit desirable properties such as improved softness, greater fabric open area, increased dryness, improved strike-through and run-off properties, and the like. Further, for filtration applications of nonwoven webs, a web having increased loft would exhibit such desirable properties as increased filtration efficiencies and filtrant holding capacities.

There are various ways in which loft can be imparted to fabrics. For example, the fibers or yarns which form the fabrics may be crimped to thus impart bulk or loft to the resulting fabrics. Conventional methods for crimping yarns include mechanical processes such as stuffer box crimping, gear crimping, and false twist texturizing, for example. While such mechanical crimping processes can be used in some of the known methods for producing nonwoven fabrics, mechanical crimping processes are not applicable to the production of spunbonded nonwoven fabrics, due to the continuous nature of the spinbonding process.

Another approach to producing crimped filaments or yarns is through the use of structured matrix bicomponent or multicomponent fibers. Such fibers generally comprise two or more polymer components having differing compositions or thermal properties. When the fibers are processed, e.g. subjected to heat, they develop a crimp. However, this approach has its disadvantages as well. Typically bicomponent fibers are expensive and require specialized equipment and processing techniques.

The present invention is based on the discovery that a phenomenon known as melt-fracture can be used advantageously to produce nonwoven webs with increased loft. By appropriate control of the extrusion and drawing conditions, filaments are produced which exhibit a crimped structure. When applied to a continuous nonwoven fabric production method, such as spinbonding, a high-loft nonwoven fabric formed of the crimped melt-fractured filaments is produced in a continuous operation.

Melt-fracture is a form of melt flow instability in the extrusion of polymers caused by the extrusion of polymeric materials at shear stresses above a critical level. As the extrusion rate increases, the internal strain on the polymer also increases until the critical shear rate is reached. Typically, melt-fracture limits the rate and extent a polymer can be meltdrawn and results in a distortion of the surface of an extrudate.

Processing temperatures during extrusion of polymers also limits the rate of production and may cause melt-fracture. As processing temperatures increase, the polymer flows more easily, thereby reducing the shear stresses and reducing the likelihood of melt-fracture.

The geometry of spinneret orifices also may produce melt-fracture and thereby affect both extrudate appearance and production efficiency. The smaller the spinneret orifices, the higher the increase in pressure on the polymer as it passes through the orifices. This also increases internal strain on the polymer until a critical shear level is reached and the extrudate becomes rough. See D. Chang, Rheology in Polymer Processing, pps. 304-315 (Academic Press, Inc., New York, N.Y. 1976).

The occurrence of melt-fracture has been ordinarily regarded a problem which must be avoided. Because it is viewed as a problem, there have been attempts to manipulate processing conditions in the production of fibers to prevent the occurrence of melt-fracture. For example, processing conditions such as temperatures have been manipulated. Others have attempted to prevent melt-fracture by using a die structure configuration to alleviate pressure forces on the polymer as it is extruded.

There have been instances where melt-fracture has been purposefully induced for particular reasons. For example, U.S. Pat. No. 3,574,808 to Matthews et al. teaches a method of forming patterned articles such as containers, film, and sheetstock by blow molding, free blowing, and casting processes employing melt-fracture. U.S. Pat. No. 3,415,796 to Souder et al. teaches a method of forming a film, such as films used as sandwich or trash bags, with a roughened surface, and U.S. Pat. No. 4,615,858 to Su teaches a method for forming polymeric products with decorative patterns resulting from melt-fracture. None of these patents, however, teach the use of melt-fracture in the production of fibers, or suggest that melt-fracture can serve any beneficial purpose in the production of melt extruded fibers or nonwoven fabrics.

SUMMARY OF THE INVENTION

The present invention provides a method by which a nonwoven fabric having increased loft may be produced in a continuous operation. In accordance with the present invention, a nonwoven filamentary web is produced by extruding a molten thermoplastic polymer or polymer blend through a spinneret to form continuous filaments while maintaining extrusion conditions which induce melt-fracture of the extrudate. The thus extruded melt-fractured filaments are attenuated to obtain filamentary material having a crimped structure and the attenuated, melt-fractured filamentary material is deposited on a collection surface to form a web therefrom. The melt-fracture of the extrudate is induced by appropriately controlling the polymer throughput through the spinneret, the spinneret die configuration and the extrusion temperature.

The present invention also provides a spunbonded nonwoven fabric comprising a web of bonded thermoplastic continuous filaments extruded under conditions which induce melt-fracture of the extrudate.

The invention also provides a method for producing crimped filamentary material, comprising the steps of extruding a molten thermoplastic polymer or polymer blend through a spinneret to form continuous filaments while maintaining extrusion conditions which induce melt-fracture of the extrudate; and attenuating the thus extruded melt-fractured filaments to obtain filamentary material having a crimped structure.

The invention also provides absorbent composites in which the spunbonded high loft nonwoven fabric produced according to the invention is a component, such as a layer in a disposable diaper, an adult incontinence pad, a sanitary napkin or the like. In one aspect of this embodiment of the invention, an absorbent composite is produced by combining a spunbonded fabric according to the invention with an absorbent laminate. Advantageously, the absorbent laminate is an absorbent body layer with an adjacent substantially liquid impermeable backsheet layer. In another aspect of this embodiment of the invention, a spunbonded fabric according to the invention is provided with barrier properties and combined an absorbent body comprising an absorbent body located in a facing relationship with the inner surface of a substantially liquid permeable topsheet layer.

The nonwoven webs and absorbent composites produced in accordance with this invention can have various benefits and advantages. As compared with conventional techniques for producing nonwoven webs, the present invention provides a method for economically texturizing and imparting crimp to the filaments, and therefore increased loft and volume, to the filaments of the webs. The nonwoven spunbonded webs of the invention, therefore, can have improved aesthetic and absorbency properties.

BRIEF DESCRIPTION OF THE DRAWINGS

Other features and advantages of the present invention will become apparent from the detailed description which follows, and from the accompanying drawings, in which.

DETAILED DESCRIPTION OF THE INVENTION

Figure 1:
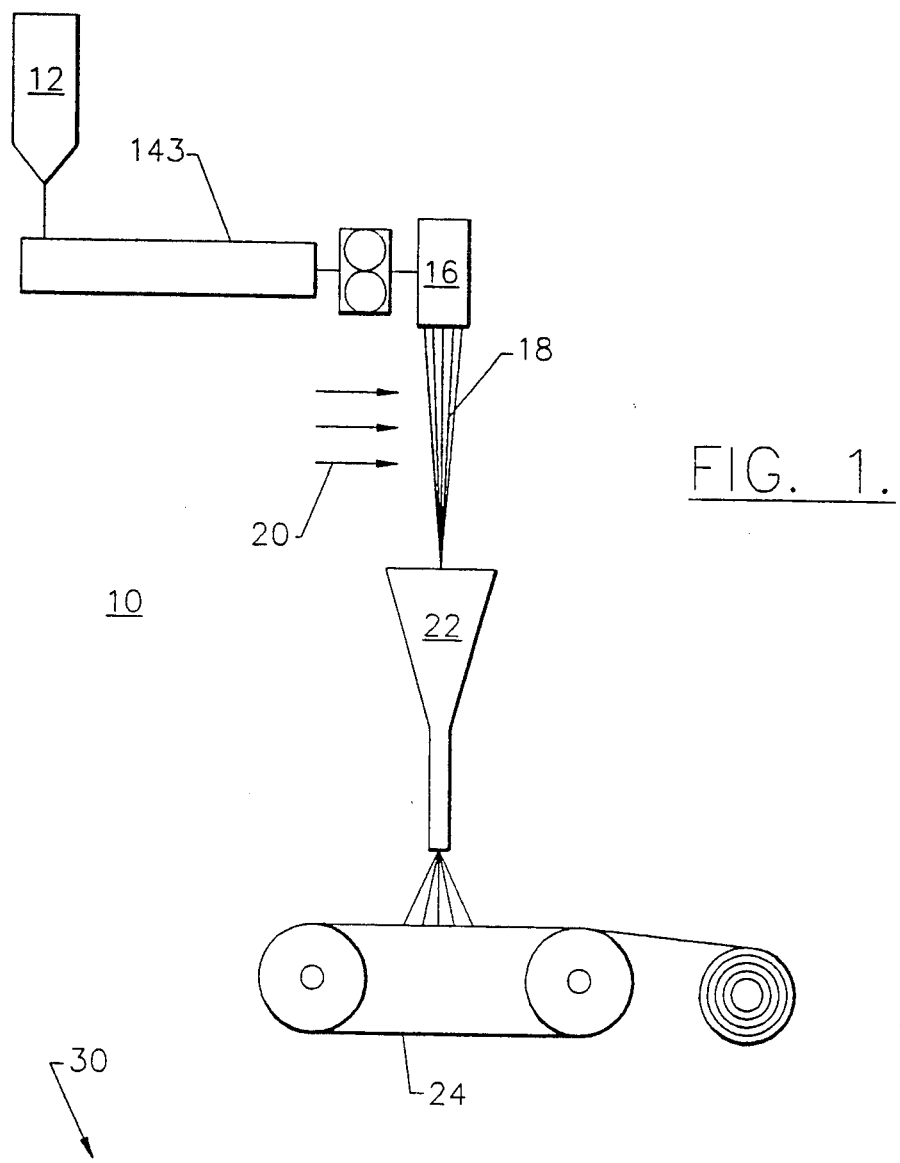
FIG. 1 schematically illustrates a method and apparatus for producing a spunbonded nonwoven fabric in accordance with the invention.

FIG. 1 schematically illustrates an apparatus, designated generally as 10, for producing a spunbonded fabric in accordance with the invention. Various spinbonding techniques exist, but all typically include the basic steps of extruding continuous filaments, quenching the filaments, drawing or attenuating the filaments by a high velocity fluid, and collecting the filaments on a surface to form a web.

One difference in the various spinbonding processes is the attenuation device. For example, in the Lurgi spinbonding process, multiple round or tube-shaped devices attenuate the filaments. A molten polymer is extruded from a spinneret as continuous filaments. The filaments are quenched, or solidified, by a flow of air and then enter the attenuator gun where they are entrained with and drawn by large quantities of high pressure air. As the filaments and air exit the gun, they form a cone or a fan of separated filaments which ar deposited on a forming wire where they form a nonwoven filamentary web.

Various slot draw processes are also used to produce spunbonded nonwoven webs. In slot drawing, the multiple tube attenuators are replaced with a single slot-shaped attenuator which covers the full width of the machine. A supply of air is admitted into the slot attenuator below the spinneret face with or without a separate quench step. The air proceeds down the attenuator channel, which narrows in width in the direction away from the spinneret, creating a venturi effect, and causing filament attenuation. The filaments exit the attenuator channel and are collected on the forming wire. The attenuation air, depending on the type of slot draw process used, can be directed into the attenuation slot by a low pressure air supply above the slot, or by a vacuum located below the forming wire.

In the embodiment of the invention shown in FIG. 1, the spinbonding apparatus is indicated by the reference character 10, and comprises a melt spinning section comprising a feed hopper 12 and an extruder 14 for the polymer. Any polymer or polymer blend which is capable of being melt spun to form filaments may be used in the present invention. Examples of polymers which may be suitably used in the present invention include polyester, acrylic, polyamide, polyolefin such as polyethylene, polypropylene, copolymers of the same, or the like, or other thermoplastic polymers, as well as copolymers and blends of these and other thermoplastic polymers. One particularly useful polymer is polypropylene, and most preferably isotactic polypropylene having a melt flow rate from about 10 to about 50.

The extruder 14 is provided with a generally linear die head or spinneret 16 for melt spinning streams of substantially continuous filaments 18. The spinneret preferably produces the streams of filaments in substantially equally spaced arrays and the die orifices are preferably from about 150 to about 300 micrometers in diameter. As the filaments exit the spinneret 16, they are quenched by a supply of cooling air 20 and are then directed to an attenuation zone 22. Although separate quench and attenuation zones are shown in the drawing, it will be apparent to the skilled artisan that the filaments can exit the spinneret 16 directly into an attenuation zone 22 where the filaments can be quenched, either by the supply of attenuation air or by a separate supply of quench air.

In the attenuation zone 22, the filaments become entrained in a high velocity stream of attenuation air and are thereby attenuated or drawn. Desirably, the air in the attenuation zone has a velocity of about 500 to 10,000 meters/minute. The attenuation air may be directed into the attenuation zone 22 by an air supply above the slot, by a vacuum located below a forming wire 24 or by the use of eductors integrally formed in the slot. The air proceeds down the attenuator zone 22, which narrows in width in the direction away from the spinneret 16, creating a venturi effect which increases the velocity of the filaments and causes filament attenuation. The air and filaments are discharged from the lower end of the attenuation zone 22 and the filaments are collected on a forming wire 24 to form a nonwoven web. Filaments produced according to the invention may have a diameter in the range of about 5 to about 500 micrometers. The invention is especially suited for producing very fine diameter filaments with a diameter of 10 to 50 micrometers.

As the filaments are being extruded, the extrusion conditions are controlled to induce melt-fracture of the extrudate. There are a number of conditions or combinations of conditions which can be varied in order to achieve melt fracture. The particular combination of conditions or parameters needed to produce melt-fracture in a given polymer can be readily arrived at by those skilled in the art without requiring undue experimentation. One processing condition which may be controlled to induce melt-fracture is the throughput rate of the polymer. The throughput rate may range from about 0.1 grams/hole/minute to about 5 grams/hole/minute, and is sufficient to provide drawn filaments at a rate of about 300 to about 6000 meters per minute. In a preferred embodiment, the filaments 18 are produced at a rate of about 4000 meters per minute. The geometry of the extrusion orifice may also be designed to favor melt-fracture. Relatively small diameter die orifices, on the order of from about 150 to about 300 micrometers are preferred. Melt-fracture conditions are also favored when the die orifice has a relatively high length to diameter ratio. Length to diameter (L/D) ratios of from about 2:1 to about 10:1 are preferred, and ratios of about 4:1 to 6:1 being especially suitable. The extrusion temperature may also be controlled to induce melt-fracture. This factor is polymer specific, and varies according to the particular polymer or polymer blend being processed. In one aspect of this embodiment of the invention, the filaments are polypropylene filaments extruded from the spinneret at a melt temperature of at least about 230° C.

Conditions favoring melt fracture also exist when the polymer shear rate is relatively high. For polypropylene, for example, the shear rate should preferably be in excess of 10,000 sec$^{-1}$, and most desirably in excess of 20,000 sec$^{-1}$, depending upon the particular polymer characteristics, such as melt flow rate, molecular weight, and other factors.

Figure 2:
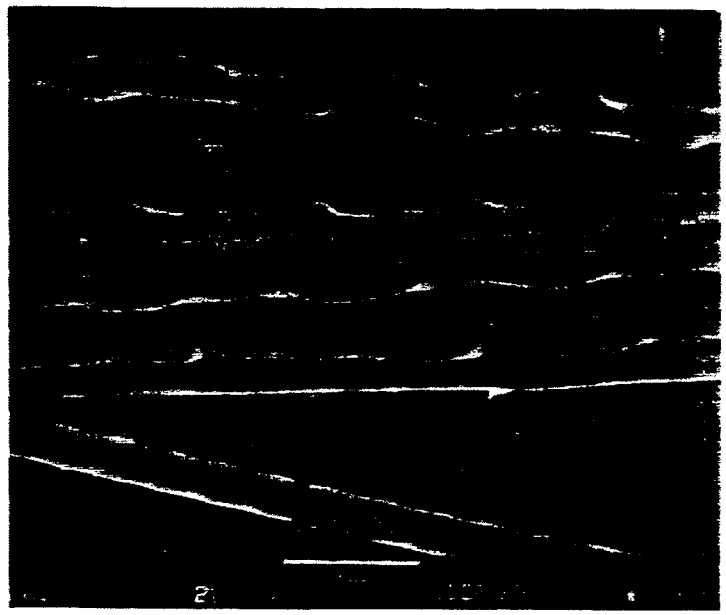
FIG. 2 is a photomicrograph taken at 20× magnification of a melt-fractured filament according to the invention prior to attenuation.

FIG. 2 is a photomicrograph taken at 20× magnification of an undrawn melt-fractured filament recovered from a spinbonding process according to the invention before the filament entered the draw zone. The photograph illustrates the irregular and uneven diameter and surface characteristics imparted by melt-fracture to undrawn filaments produced according to the invention. While the applicant does not wish to be bound by any theory of the invention, it is believed that when the filaments are drawn and attenuated, the irregular and uneven diameter and surface characteristics cause the drawn filaments to develop a random, irregular crimp which imparts bulk or loft to nonwoven fabrics formed from the filaments. It is also believed that the use of a high velocity fluid as the attenuation means contributes to the development of a random crimp in the filaments, since the filaments are not mechanically restrained and are thus free to bend and crimp in all directions. Additionally, the irregular and uneven diameter and rough surfaces of the filaments is believed to contribute to the crimping and to the filaments becoming entrained in the high velocity fluid in the attenuation zone.

The term bulk refers to an increase in volume of filaments resulting from modification or manipulation of the filaments. In the invention, the bulk of the filaments is measured and reported as a loft number. In the invention, loft is measured by weighing samples of filaments comprised of the same polymer and placing the samples in a glass cylinder and compressing the filaments with flat 40 gram plate. To calculate the loft of the filaments, the compressed filament volume is divided by the measured filaments weight to yield the loft measurement for filaments produced under particular conditions. The filaments according to the invention have a loft from about 55 cc/g to about 100 cc/g.

Figure 3:
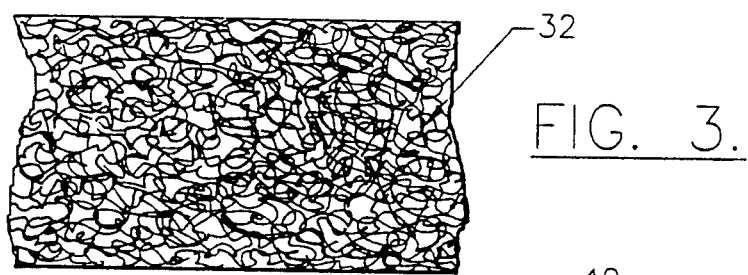
FIG. 3 is a fragmentary plan view of a nonwoven fabric in accordance with one embodiment of the invention.

FIG. 3 is a fragmentary plan view of one embodiment of a spunbonded web according to the invention. The web designated as 30 is comprised of crimped continuous filaments 32 according to the invention prepared as described above. Spunbonded webs produced according to the invention are characterized by having significantly greater bulk or caliper than conventionally produced spunbonded webs. Such webs have a caliper of at least about 0.019"/ounce/yd$^2$ using a 95 g/in$^2$ compression force. This value is significantly higher than that seen in a spunbonded web formed from non-melt fractured filaments. Webs produced according to the invention may optionally contain other fibers or filaments in addition to the melt-fractured filaments produced as disclosed above. For example, the web may comprise the crimped filaments disclosed above alone or mixed with natural fibers, such as cotton fibers, wool fibers, silk fibers, or the like, or mixed with cellulosic-derived fibers, such as wood fibers, for example wood pulp, rayon fibers, or the like. The crimped filaments of the invention may also be mixed with man-made fibers, such as polyester fibers, acrylic fibers, polyamide fibers such as nylon, polyolefin fibers, such as polyethylene, polypropylene, copolymers of the same, or the like, or other thermoplastic polymers, as well as copolymers and blends of these and other thermoplastic fibers. The man-made fibers may be substantially continuous filaments or staple fibers. Advantageously, the webs comprise at least about 50% by weight, and more advantageously at least about 75% by weight, of the crimped filaments of the invention.

Figure 4:
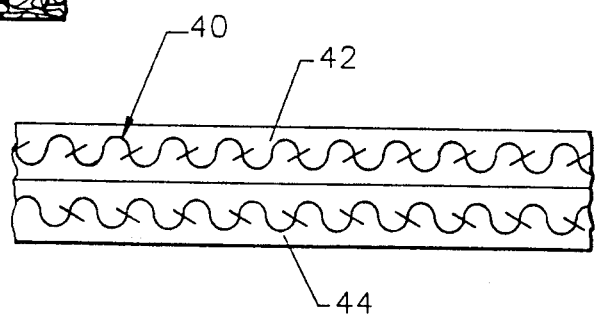
FIG. 4 is a fragmentary cross-sectional view of a composite nonwoven fabric in accordance with another embodiment of the invention.

FIG. 4 is a schematic cross-sectional view of a composite nonwoven fabric in accordance with one embodiment of the invention. The embodiment of FIG. 4, generally indicated at 40, comprises a two ply laminate. Ply 42 comprises a web which may be a meltblown nonwoven web, a spunbonded web or a web of carded staple fibers. Ply 44 comprises a spunbonded nonwoven web according to the invention. The plies may be bonded and/or laminated in any of the ways known in the art. Lamination and/or bonding may be achieved, for example, by hydroentanglement of the fibers, spot bonding, through air bonding or the like. The term spot bonding is inclusive of continuous or discontinuous pattern bonding, uniform or random point bonding or a combination thereof, all as are well known in the art. It is also possible to achieve bonding through the use of an appropriate bonding agent, such as acrylics or thermoplastic adhesives. The bonding may be made after assembly of the laminate so as to join all of the plies or it may be used to join only selected of the fabric plies prior to the final assembly of the laminate. Various plies can be bonded by different bonding agents in different bonding patterns. Overall, laminate bonding can also be used in conjunction with individual layer bonding.

The laminate 40 of FIG. 4 comprises a two ply structure, but there may be two or more similar or dissimilar plies depending upon the particular properties sought for the laminate. The nonwoven web according to the invention can advantageously be used as a coverstock layer in a disposable personal care product. In one aspect of this embodiment of the invention, the nonwoven web of the invention is used as a topsheet layer in a diaper. The nonwoven webs according to the invention may also be used as a component in other disposable products, such as incontinence pads, sanitary napkins, and the like. Further, the nonwoven webs of the invention may be used in these products in combination with other webs, such as a liquid impermeable layer and an absorbent body.

EXAMPLE 1

A controlled rheology isotactic polypropylene having a melt flow rate (MFR) of 36 was extruded through a spinneret at a temperature of approximately 250° C. The spinneret pack was composed of a sintered metal filtration media (Mott PG-4, 40 micron nominal pore size) immediately before the spinneret plate equipped with 34 evenly spaced holes. Each hole had a diameter of 150 μm and a 6:1 length to diameter ratio. Throughput per hole was 1.00 gram/minute/hole or approximately 1.37 cubic centimeters/minute/hole, and the shear rate was approximately 76,000 $sec^{-1}$.

The extrudate exhibited severe melt-fracture. The extrudate was drawn using an air aspirated attenuator gun of the Crown Zellerbach design at 230 psig and the filaments were drawn to a final denier per filament of 1.77. The resulting filaments exhibit melt-fracture and are very crimped.

EXAMPLE 2

For purposes of comparison, fibers of an isotactic polypropylene were produced under conditions which did not induce melt-fracture. An isotactic polypropylene having a melt flow rate (MFR) of 36 was extruded through a spinneret at a temperature of approximately 250° C. The spinneret pack was composed of a sintered metal filtration media (Mott PG-4, 40 micron nominal pore size) immediately before the spinneret plate equipped with 34 evenly spaced holes. Each hole had a diameter of 150 μm and a 2:1 length to diameter ratio. Throughput per hole was 0.68 gram/minute/hole and the shear rate was approximately 48,000 $sec^{-1}$. The extrudate was drawn using an air aspirated attenuator gun of the Crown Zellerbach design at 230 psig. Filaments were drawn to a final denier per filament of 0.875. The filaments were smooth and linear and did not exhibit melt fracture.

EXAMPLE 3

A third control was prepared from isotactic polypropylene under conditions which did not induce melt-fracture. An isotactic polypropylene having a melt flow rate (MFR) of 36 was extruded through a spinneret at a temperature of approximately 225° C. The spinneret pack was composed of a sintered metal filtration media (Mott PG-4, 40 micron nominal pore size) immediately before the spinneret plate equipped with 34 evenly spaced holes. Each hole had a diameter of 300 μm and a 2:1 length to diameter ratio. Throughput per hole was 1.37 gram/minute/hole and the shear rate was approximately 8,900 $sec^{-1}$. The extrudate was drawn using an air aspirated attenuator gun of the Crown Zellerbach design at 230 psig. Filaments were drawn to a final denier per filament of 1.37. The filaments did not exhibit melt-fracture.

EXAMPLE 4

A fourth control was prepared from isotactic polypropylene under conditions which did not induce melt-fracture. An isotactic polypropylene having a melt flow rate (MFR) of 36 was extruded through a spinneret at a temperature of approximately 225° C. The spinneret pack was composed of a sintered metal filtration media (Mott PG-4, 40 micron nominal pore size) immediately before the spinneret plate equipped with 34 evenly spaced holes. Each hole had a diameter of 300 μm and a 2:1 length to diameter ratio. Throughput per hole was 0.68 gram/minute/hole and the shear rate was approximately 5,800 $sec^{-1}$. The extrudate was drawn using an air aspirated attenuator gun of the Crown Zellerbach design at 230 psig. Filaments were drawn to a final denier per filament of 1.98. The filaments did not exhibit melt-fracture.

Properties for the filaments produced according to Examples 1 through 4 were tested, the results of which are set out in the table below.

TABLE 1

| Ex | Melt Temp °C. | Hole Geometry (μm) | Thruput (cc/hole) | dpf (SD) (g/9000 m) | Tenacity (SD) (g/d) | Elong. at break (SD) (%) | Loft (SD) (cc/g)** |
| --- | --- | --- | --- | --- | --- | --- | --- |
| 1 | 250 | 150 × 900 | 1.37 | 1.77 (0.27) | 1.81 (0.49) | 161 (36) | 61.4 (2.5) |
| 2 | 250 | 150 × 300 | 0.68 | 0.875 (0.24) | 2.81 (0.67) | 197 (30) | 51.5 (2.4) |
| 3 | 225 | 300 × 600 | 1.37 | 2.58 (0.34) | 1.75 (0.34) | 191 (32) | 48.0 (3.2) |
| 4 | 225 | 300 × 600 | 0.68 | 1.98 (0.43) | 1.4 (0.44) | 230 (49) | 47.4 (3.15) |

**Weighed samples placed in a glass cylinder and compressed with a flat 40 gram plate. The compressed fiber volume was divided by the fiber weight to yield loft. Reported value is the average of 4 replications.

EXAMPLE 5

A sample of a nonwoven web is prepared from the crimped filaments described in Example 1. After fiber attenuation, the filaments are formed into a web and bonded to form a high loft spunbonded web. A sample of the spunbonded web is placed on one side of an absorbent body, substantially made of staple textile cotton fibers with wood pulp incorporated therein. On the opposite side of the absorbent body is located a substantially liquid impermeable backsheet layer. The spunbonded web is combined with the absorbent body and the substantially liquid impermeable backsheet layer by hydroentanglement, as disclosed in U.S. Pat. No. 4,775,579.

The invention has been described in considerable detail with reference to its preferred embodiments. It will be apparent that numerous variations and modifications can be made without departing from the spirit and scope of the invention as described in the foregoing detailed specification and as defined in the following claims.

That which is claimed is:

1. A spunbonded nonwoven fabric having a caliper of at least about 0.019"/ounce/yd$^2$ using a 95 g/in$^2$ compression force and comprising attenuated crimped continuous filaments of a melt-fractured thermoplastic polymer or thermoplastic polymer blend.

2. A spunbonded nonwoven fabric according to claim 1 wherein said thermoplastic polymer or thermoplastic polymer blend comprises one or more members selected from the group consisting of polyester, acrylic polymer, polyamide, and polyolefin polymers or copolymers.

3. A spunbonded nonwoven fabric according to claim 1 wherein said crimped filaments are formed of polypropylene.

4. A spunbonded nonwoven fabric according to claim 1 also including other fibers selected from the group consisting of cotton fibers, wool fibers, silk fibers, wood pulp, rayon fibers, acrylic fibers, polyamide fibers, polyolefin fibers, and copolymers and blends of the same.

5. A spunbonded nonwoven fabric comprising a web having a caliper of at least about 0.019"/ounce/yd$^2$ using a 95 g/in$^2$ compression force wherein the web comprises bonded thermoplastic attenuated crimped continuous filaments extruded under conditions which induce melt-fracture of the extrudate.

6. Attenuated crimped continuous filaments formed of a melt-fractured thermoplastic polymer or thermoplastic polymer blend and having a loft of from about 55 cc/g to about 100 cc/g.

7. A composite nonwoven fabric comprising a plurality of layers, at least one of said layers comprising a spunbonded nonwoven web having a caliper of at least about 0.019"/ounce/yd$^2$ using a 95 g/in$^2$ compression force wherein the web comprises bonded thermoplastic attenuated crimped filaments extruded under conditions which induce melt-fracture of the extrudate.

8. A composite nonwoven fabric according to claim 7 wherein at least one of the layers comprises an absorbent layer.

9. A composite nonwoven fabric according to claim 7 wherein at least one of the layers comprises a moisture impermeable layer.

* * * * *